(12) United States Patent
Casazza et al.

(10) Patent No.: US 7,205,678 B2
(45) Date of Patent: Apr. 17, 2007

(54) WIND POWER GENERATOR

(76) Inventors: Matteo Casazza, I-39049 Vioiteno (IT), Via Ploner 16 (IT); Andreas Mair, I-39040 Val di Vizze (IT), Tulve di Soora 271 (IT); Otto Pabst, I-39037 Rio Pusteria (IT), Maranze 124 (IT)

( * ) Notice: Subject to any disclaimer, the term of this patent is extended or adjusted under 35 U.S.C. 154(b) by 155 days.

(21) Appl. No.: 10/489,726

(22) PCT Filed: Sep. 9, 2002

(86) PCT No.: PCT/IB02/03741

§ 371 (c)(1),
(2), (4) Date: Mar. 12, 2004

(87) PCT Pub. No.: WO03/023943

PCT Pub. Date: Mar. 20, 2003

(65) Prior Publication Data

US 2004/0232704 A1    Nov. 25, 2004

(30) Foreign Application Priority Data

Sep. 13, 2001  (IT) ................ BZ2001A0043

(51) Int. Cl.
*F03D 11/00* (2006.01)
*F03D 3/00* (2006.01)
(52) U.S. Cl. ............... 290/55; 290/44; 416/147
(58) Field of Classification Search ............ 290/44, 290/55, 43, 54; 415/2.1, 43; 416/147
See application file for complete search history.

(56) References Cited

U.S. PATENT DOCUMENTS

| | | | |
|---|---|---|---|
| 3,789,252 A | 1/1974 | Abegg | |
| 4,087,698 A | 5/1978 | Myers | |
| 4,289,970 A * | 9/1981 | Deibert | 290/44 |
| 4,291,235 A * | 9/1981 | Bergey et al. | 290/55 |
| 4,292,532 A | 9/1981 | Leroux | |
| 4,350,897 A | 9/1982 | Benoit | |
| 4,517,484 A | 5/1985 | Dacier | |
| 4,720,640 A | 1/1988 | Anderson et al. | |
| 4,761,590 A | 8/1988 | Kaszman | |
| 4,900,965 A | 2/1990 | Fisher | |

(Continued)

FOREIGN PATENT DOCUMENTS

DE    4 304 577    8/1994

(Continued)

OTHER PUBLICATIONS

Maxime R. Dubous, Henk Polinder, Study of TFPM Machines with Toothed Rotor Applied to Direct-Drive Generators for Wind Turbines, 2004.
Variable Speed Gearless Wind Turbine (website), http://www.mhi.cojp/msmw/mw/en/gearless.html, viewed on Sep. 22, 2006.

*Primary Examiner*—Nicholas Ponomarenko
(74) *Attorney, Agent, or Firm*—Shlesinger & Fitzsimmons

(57) ABSTRACT

The invention relates to a wind power current generator comprising a bearing, a tubular stator that carries a race of the bearing, a tubular rotor coaxial with the tubular stator that can rotate in relation to the stator, a hub connected to the rotor, and at least two blades radially extending away from the hub. According to the invention, the stator and the rotor are formed with substantially tubular cross sections and are concentric to one another. The opposing surfaces of the rotor and stator carry permanent magnets and windings. The stator and rotor extend beyond either side of the magnets and the windings in order to accommodate an antifriction bearing on at least one side. The tubular nature of the rotor and stator allows easy passage of workers within the generator for maintenance thereof and of the blades. Additionally, the tubular nature facilitates air flow through the structure and out the blades, cooling equipment within the structure and aiding de-icing of the blades.

4 Claims, 3 Drawing Sheets

U.S. PATENT DOCUMENTS

| | | | |
|---|---|---|---|
| 4,906,060 A | 3/1990 | Claude | |
| 5,004,944 A | 4/1991 | Fisher | |
| 5,281,094 A * | 1/1994 | McCarty et al. | 416/147 |
| 5,311,092 A | 5/1994 | Fisher | |
| 5,315,159 A | 5/1994 | Gribnau | |
| 5,663,600 A | 9/1997 | Baek et al. | |
| 5,696,419 A | 12/1997 | Rakestraw et al. | |
| 5,783,894 A | 7/1998 | Wither | |
| 5,798,632 A | 8/1998 | Muljadi | |
| 5,844,341 A | 12/1998 | Spooner et al. | |
| 5,986,378 A | 11/1999 | Caamano | |
| 6,064,123 A | 5/2000 | Gislason | |
| 6,177,746 B1 | 1/2001 | Tupper et al. | |
| 6,278,197 B1 | 8/2001 | Appa | |
| 6,285,090 B1 * | 9/2001 | Brutsaert et al. | 290/55 |
| 6,417,578 B1 | 7/2002 | Chapman et al. | |
| 6,452,287 B1 * | 9/2002 | Looker | 290/55 |
| 6,483,199 B2 * | 11/2002 | Umemoto et al. | 290/55 |
| 6,504,260 B1 * | 1/2003 | Debleser | 290/44 |
| 6,590,312 B1 | 7/2003 | Seguchi et al. | |
| 6,664,692 B1 | 12/2003 | Kristoffersen | |
| 6,720,688 B1 | 4/2004 | Schiller | |
| 6,759,758 B2 | 7/2004 | Torres Martinez | |
| 6,762,525 B1 | 7/2004 | Maslov et al. | |
| 6,794,781 B2 | 9/2004 | Razzell et al. | |
| 6,828,710 B1 | 12/2004 | Gabrys | |
| 6,888,262 B2 | 5/2005 | Blakemore | |
| 6,911,741 B2 | 6/2005 | Pettersen et al. | |
| 6,921,243 B2 * | 7/2005 | Canini et al. | 415/4.3 |
| 6,951,443 B1 | 10/2005 | Blakemore | |
| 6,972,498 B2 | 12/2005 | Jamieson | |
| 7,004,724 B2 | 2/2006 | Pierce et al. | |
| 7,008,348 B2 | 3/2006 | LaBath | |
| 7,016,006 B2 | 3/2006 | Song | |
| 7,021,905 B2 | 4/2006 | Torrey et al. | |
| 7,042,109 B2 | 5/2006 | Gabrys | |
| 7,075,192 B2 * | 7/2006 | Bywaters et al. | 290/55 |
| 7,095,128 B2 | 8/2006 | Canini et al. | |
| 7,098,552 B2 | 8/2006 | McCoin | |
| 2002/0047418 A1 | 4/2002 | Seguchi et al. | |
| 2003/0102677 A1 | 6/2003 | Becker et al. | |
| 2003/0137149 A1 | 7/2003 | Northrup et al. | |
| 2003/0230898 A1 | 12/2003 | Jamieson et al. | |
| 2003/0230899 A1 | 12/2003 | Martinez | |
| 2004/0119292 A1 | 6/2004 | Darra et al. | |
| 2004/0151577 A1 | 8/2004 | Pierce et al. | |
| 2004/0162181 A1 | 8/2004 | LaBath | |
| 2005/0082839 A1 | 4/2005 | McCoin | |
| 2006/0006658 A1 | 1/2006 | McCoin | |
| 2006/0012182 A1 | 1/2006 | McCoin | |
| 2006/0066110 A1 | 3/2006 | Jansen et al. | |
| 2006/0071575 A1 | 4/2006 | Jansen et al. | |
| 2006/0125243 A1 | 6/2006 | Miller | |

FOREIGN PATENT DOCUMENTS

| | | |
|---|---|---|
| EP | 0 627 805 | 12/1994 |
| EP | 1 677 002 | 11/2003 |
| EP | 1 375 913 | 1/2004 |
| EP | 1 363 019 | 3/2004 |
| FR | 2 760 492 | 9/1998 |
| FR | 2 796 671 | 1/2001 |
| FR | 2 810 374 A1 | 12/2001 |
| GB | 2 050 525 | 1/1981 |
| GB | 2 372 783 | 9/2002 |
| NL | 8 902 534 | 5/1991 |
| RU | 2 000 466 | 9/1993 |
| WO | WO 91/05953 | 5/1991 |
| WO | WO 92/12343 | 7/1992 |
| WO | WO 98/40627 | 9/1998 |
| WO | WO 99/33165 | 7/1999 |
| WO | WO 99/39426 | 8/1999 |
| WO | WO 01/06623 | 1/2001 |
| WO | WO 01/07784 | 2/2001 |
| WO | WO 01/35517 | 5/2001 |
| WO | WO 01/69754 | 9/2001 |
| WO | WO 02/33254 | 4/2002 |
| WO | WO 03/067081 | 8/2003 |
| WO | WO 2004/017497 | 2/2004 |

* cited by examiner

ID GENERATOR

CROSS-REFERENCE TO RELATED APPLICATIONS

None applicable.

BACKGROUND AND SUMMARY

The present invention relates to a wind power generator. More particularly, embodiments relate to a large-scale wind powered machine that accommodates humans within the workings for easy access and maintenance while providing efficient cooling of components and/or de-icing of blades. Embodiments are particularly suited to electrical power generation via wind power.

Wind powered machines, particularly large scale electrical generators, include blades mounted on a hub attached to a rotor that rotates when wind passes over the blades. The rotation of the rotor is then used to drive machinery, such as pumps or electrical generators. In the case of electrical generators, the rotor will typically carry conductor windings/coils or magnetic field generators that face magnetic field generators or conductor windings/coils, respectively, on a stator such that there is relative motion between the coils and the magnetic field generators, producing electricity. The magnetic field generators are typically field windings that are electromagnets powered by the electrical generator once it begins producing electricity, but that require electricity from a battery or the like before the electrical generator produces electricity.

Large scale wind powered electrical generators are becoming more common, particularly in onshore and offshore wind farm applications. In such large scale generators, a tower supports a nacelle housing the stator, which supports the rotor, which supports the hub and blades. Equipment required for controlling the generator, including controls for the blades and other machinery, can be housed in the tower, the nacelle, and/or in cavities within the stator and/or the rotor.

An example of a large scale wind powered generator is seen in international application WO 01/29413 by Torres Martinez (equivalent to European Patent Application No. EP 1319830 A1) and entitled, "Multipolar Aerogenerator." So-called multipolar wind power generators typically comprise a wind-driven rotor associated with a power generator housed in a nacelle atop a support tower. The nacelle is mounted for rotation on the upper end of the tower and houses electrical power generation components as well as equipment for controlling the generation of electricity, the orientation of the nacelle, the pitch of the blades, the speed of the rotor, and more. The nacelle is rotated to position the blades of the generator for maximum exposure to wind, and the pitch of the blades is similarly adjusted to optimize power generation. The rotor is secured to a rotor shaft supported by two bearings in the nacelle. The bearings are in turn supported by the housing of the nacelle, which includes the stator of the power generator. The rotor itself is comprised of a ring supported by a plurality of spokes extending radially from the shaft. The ring carries electromagnets in the form of field windings on its outer surface and facing coils mounted on the inner surface of the housing of the nacelle. Wind drives the blades, which drive the rotor shaft, which rotates the rotor and moves the electromagnetic field windings relative to the coils, generating electricity.

In such a multipolar generator, the structure of the rotor shaft and the supports in the nacelle, there is no passageway between the interior of the tower and the interior of the blades extending away from the rotor hub. Therefore, it is difficult to reach the hub for maintenance, such as to maintain blade pitch altering machinery, not to mention the rotor itself. Additionally, internal ventilation of the rotor blades, particularly for de-icing the blades, is difficult to accomplish. The construction of the wind power generator of the type disclosed by Torres Martinez is complex with regard to the support of the rotor within the stator body.

Another multipolar synchronous generator, particularly suited for horizontal axis wind power plants, is described in German patent specification DE 44 02 184 by Klinger. Klinger discloses a generator that overcomes some of the disadvantages of the type of generator disclosed by Torres Martinez by using a generator formed by one single structural unit. The single structural unit comprises a stator mounted atop a support tower, the stator being somewhat equivalent to the nacelle of Torres Martinez. The stator supports the rotor, which carries a hub to which blades are attached. As in Torres Martinez, the stator can rotate relative to the support tower to orient the blades for maximum wind exposure. The rotor is connected to the stator by a floating support provided within the generator, specifically, bearings arranged between the stator and the rotor. This single structural unit supports the rotary movement of the rotor and receives the externally introduced forces and torques. In the generator of Klinger, while the rotor shaft and related structures and components are eliminated, the structure of the rotor proves to be very complex, since the two surfaces of the rotor and of the stator lie at a considerable distance from the antifriction bearings of the rotor.

Therefore, embodiments avoid the shortcomings of conventional wind power generators by providing a wind power generator with a simpler structure in which a maximum of ventilation possibilities is guaranteed for cooling and/or de-icing. In addition, embodiments afford a large degree of accessibility to the various components of the generator while providing a high level of structural stiffness.

In a preferred embodiment, the wind power generator is a multipolar, gearless, synchronous generator that is largely hollow by virtue of the use of coaxial tubular stator and rotor elements. For additional simplification, embodiments employ, permanent magnets on one of stator and rotor, and windings/coils on the other of stator and rotor. The tubular rotor element serves simultaneously as a shaft that can be supported by bearings and as a structure for anchoring magnet bodies, eliminating the need for a ring supported by spokes extending radially from a rotor. The tubular rotor element is mounted coaxially with the tubular stator element, which is connected to the supporting structure, such as a tower.

The generator of embodiments is the integrating component of the supporting structure, and the loads are transferred directly from the hub onto the rotor shaft of the generator. The tubular rotor element transfers the loads into the tubular stator body by way of two bearings disposed at the beginning and at the end of the electrical machine.

The largely hollow structure of embodiments provides several advantages over the structures of the prior art. For example, housing electrical and electronic subsystems inside the nacelle affords excellent protection from lightning since the structure employs the principle of the Faraday cage. In addition, because the tubular structure is configured to accommodate the passage of adult humans, it permits easy access to the front portion of the nacelle and to the hub, which facilitates maintenance and repair work on other subsystems of the wind power generator. This also allows one to mount the hub from the inside.

The substantially hollow structure also facilitates use of the heat given off by equipment, such as power electronics, housed in the tower, as well as heat released by the generator itself. The heat can promote the chimney effect to guide warm air into the hub and from there into and through the rotor blades. The warm air can thus be used as a particularly efficient de-icing system in cooler times of the year, and provides a cooling effect for equipment in the generator as cooler air is drawn into and passes through the hollow structure. No external energy needs to be supplied during operation to heat the rotor blades. Thus, the heat given off by the generator and by the power electronics themselves is put to use in a simple fashion.

Additional cooling benefits are derived from the hollow structure since the components that produce heat are moved to the periphery of the generator. More specifically, the generator of embodiments places the windings on the inner periphery of the generator housing. Heat produced by the windings during electricity generation is easily conducted to the outer surface of the generator. By adding cooling fins on the outer surface according to embodiments, the heat can be transferred from the generator to the air stream passing over the generator during electricity production. The cooling fins preferably project transversely from the outer surface and are substantially equally spaced apart. While the fins extend longitudinally along the outer surface, they can also have a sweep or profile that takes into account disturbances in the air stream introduced by motion of the blades and/or the fins themselves to enhance effectiveness.

In embodiments, the substantially hollow and multipolar synchronous generator has permanent magnets on an outer body and has windings/coils on an interior body. This yields a machine having a stator unit on the inside and a rotor on the outside. The magnets are preferably attached to the inner surface of the rotor in this arrangement, and the windings to the outer surface of the rotor shaft. The advantages of such a solution are a greater specific output, the possibility of using the total heat released by the generator for the de-icing system, and a simplification of the positioning of the power cables required to conduct the electric current from the generator to the tower.

In other embodiments, a portion of the stator possesses a bell-like shape, narrowing in the direction of the hub to a head with a centric, circular orifice. The rotor also possesses a bell-like shape extending concentrically within the bell-like portion of the stator to a head with a corresponding centric orifice which merges into a tubular boss. The tubular boss extends through the orifice of the stator bell head, providing support for an antifriction bearing and, with its outer periphery, the hub. Preferably, the antifriction bearing is a tapered roller bearing with a double race. The rotor in embodiments can additionally be equipped with a brake bearing structure and can include a locking brake on the end of the rotor or stator that faces the supporting frame. In embodiments with such braking structures, the rear bearing is omitted to accommodate the braking structure, and the front bearing is a single special bearing, such as a tapered roller bearing with a double race, preferably of a smaller diameter than those used in dual-bearing embodiments. The single bearing is preferably mounted in the narrowed portion in the front part of the stator structure. This narrowed portion is provided in the form of a reinforcing, sandwich-like toroidal element which only partially reduces the accessibility to the hub.

The use of a single tapered roller bearing with a double race offers several advantages over embodiments with two bearings. The single bearing arrangement provides simplification of the generator mounting structure since only one-side need accommodate a bearing. The single bearing arrangement eliminates hazardous eddy currents in the generator that form temporary circuits between the stator wall, the rotor wall, and roller bodies of the bearings disposed at the ends of the active portion (windings/coils) of the two bearing arrangement. Further, the single bearing arrangement simplifies adjustment processes of the bearing since the tapered rollers must be pre-stressed; embodiments with two bearings at the ends of the generator present design problems with respect to the construction tolerances and thermal deformation. The single bearing arrangement requires only one system of seals and lubrication concentrated in the front region of the generator. And the bearing typology used in the single bearing arrangement offers a high degree of rolling precision since pre-stressing the rollers substantially eliminates play in the bearing, as well as providing a low rolling resistance that increases generator productivity and efficiency.

BRIEF DESCRIPTION OF THE DRAWINGS

Additional features and details are contained in the claims and in the description of a power generator actuated by wind, in its preferred embodiments as illustrated in the accompanying drawings, in which:

DESCRIPTION

Figure 1:
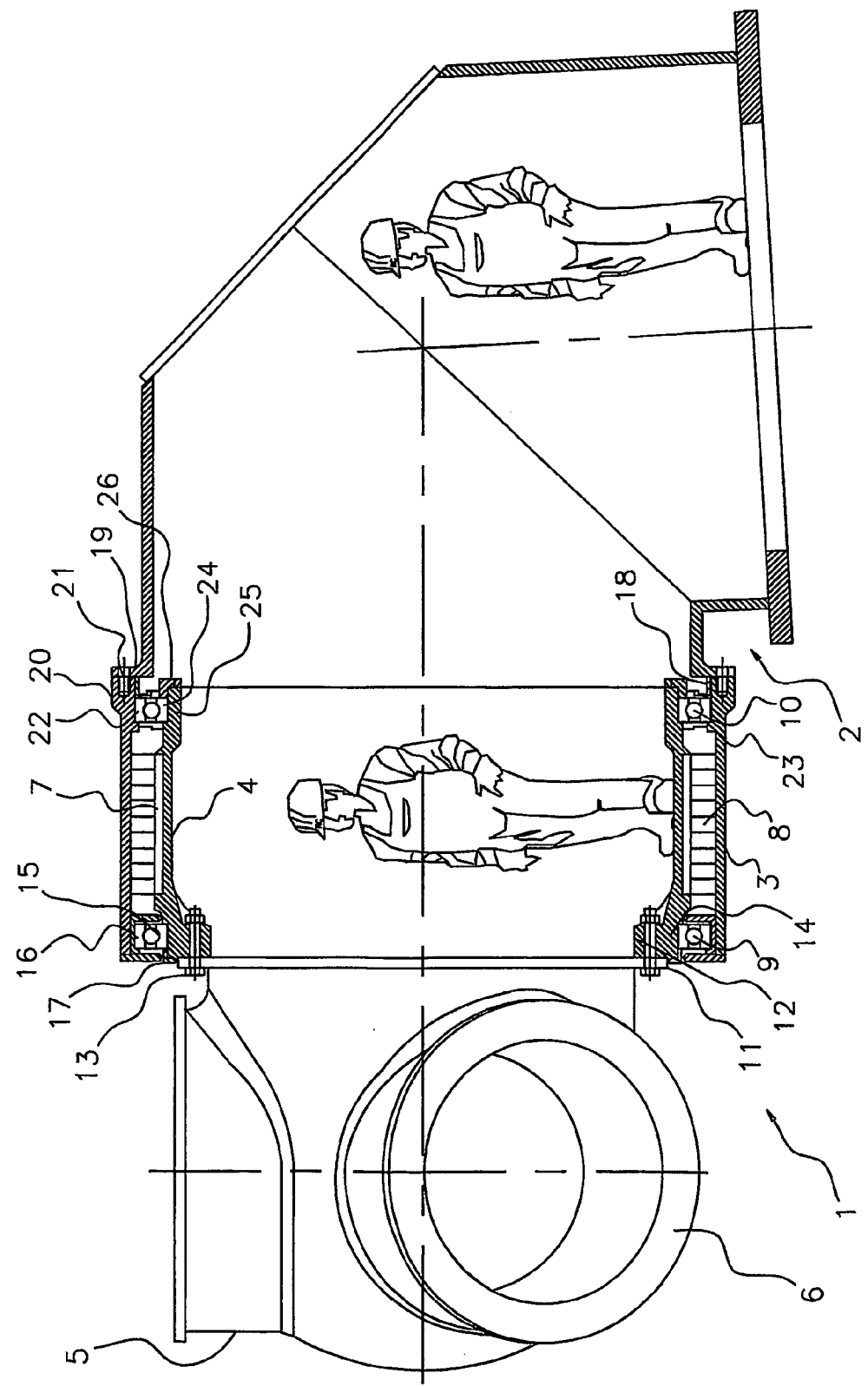
FIG. 1 shows a sectional view along a vertical axial plane of a power generator actuated by wind energy, in accordance with embodiments having the rotor tubular section within the stator tubular section.

In FIG. 1 a wind power generator is generally indicated by the reference number 1. This generator is mounted by way of a hollow transition element 2 to the upper end of a tower not further illustrated. The wind power generator 1 comprises a stator 3 and a rotor 4. The rotor 4 is connected in a known manner to a hub 5, to which, in the present case, three hollow blades not shown here are connected. The blades are attached to flanges 6 of the hub 5. The rotor 4 is has a substantially tubular cross section and, in the example shown in FIG. 1, permanent magnets 7 are set in the outer surface of the rotor 4. These magnets 7 are arranged opposite windings 8 secured on the inner surface of a the stator 3, which also has a substantially tubular cross section. Antifriction bearings 9, 10 are arranged in the end regions of the tubular stator 3. These bearings 9, 10 cooperate with the stator 3 to rotatably support the tubular rotor 4. Of the two antifriction bearings 9, 10, at least one must at least include a thrust bearing portion. Both bearings 9, 10 are arranged in such a manner that the permanent magnets 7 and the windings 8 are between the bearings 9, 10 in a direction along the rotational axis of the rotor 4. It should be noted that while permanent magnets 7 are preferred, they could be replaced by field windings, though this yields a more complicated structure.

The hub 5 is attached by its flange 11 to one of the ends of the tubular rotor 4. For example, in embodiments, the flange 11 is joined by threaded bolts 13 to an annular collar 12 of the tubular rotor 4.

On the side facing the hub 5, the tubular rotor 4 preferably has a depression 14 in its outer surface, which can receive the inner ring 15 of the antifriction bearing 9, while the outer ring 16 of the same bearing 9 is mounted on the inner surface of the tubular stator 3. In addition, the antifriction bearing 9 is preferably held in the depression 14 by an angular ring element 17.

On the end facing away from the hub 5, the tubular stator 3 is connected in embodiments to a flange 19 of the transition element 2, which flange is joined, for example, by screws 21 to a thickened edge 20 in the tubular stator 3. The outer ring 22 in the antifriction bearing 10 is preferably held in position by a radial land 23 of the stator 3 and by a spacer 18 directly abutting the flange 19, while the inner ring 24 of the same antifriction bearing 10 is received on a belt 25 recessed into the outer surface of the tubular rotor 4. The inner ring 24 can further be held in position by an angular element 26 with an L-shaped cross section.

Figure 2:
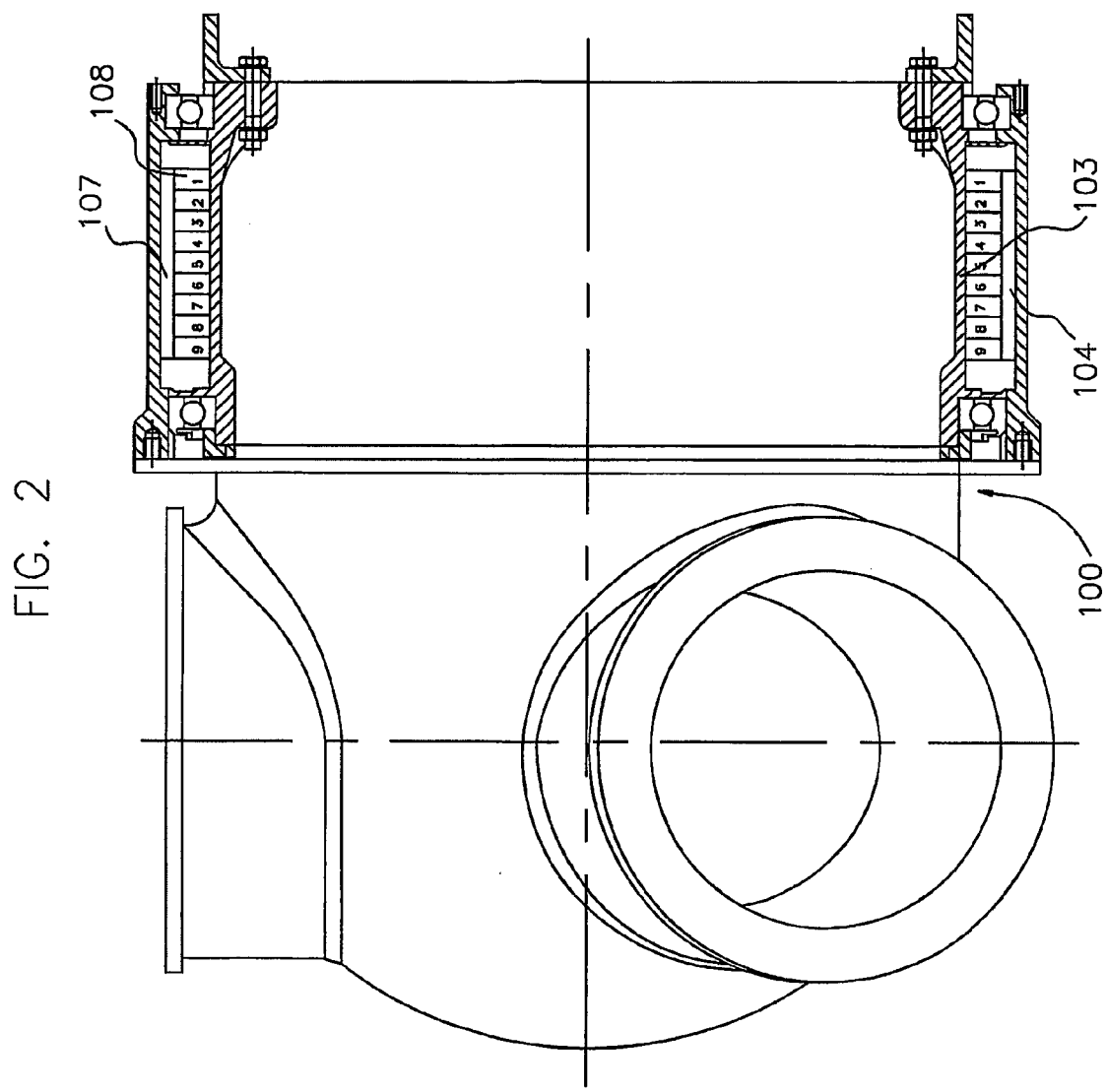
FIG. 2 shows a power generator according to embodiments in a sectional view like that of FIG. 1, but with the stator tubular section within the rotor tubular section.

The stator 3 need not be the outer member in all embodiments. For example, as seen in FIG. 2, a wind power generator 100 can comprise a substantially tubular rotor 104 located on the outside of a substantially tubular stator 103. The rotor 104 is supported by the stator 103 via bearings in a manner similar to that described with reference to FIG. 1. In this case, the windings 108 are preferably located on the outer surface of the stator 103, while the permanent magnets 107 are mounted on the inner surface of the rotor 104. Again, while permanent magnets 107 are preferred, they could be replaced by another type of magnetic field generator, such as field windings, though this yields a more complicated structure.

Figure 3:
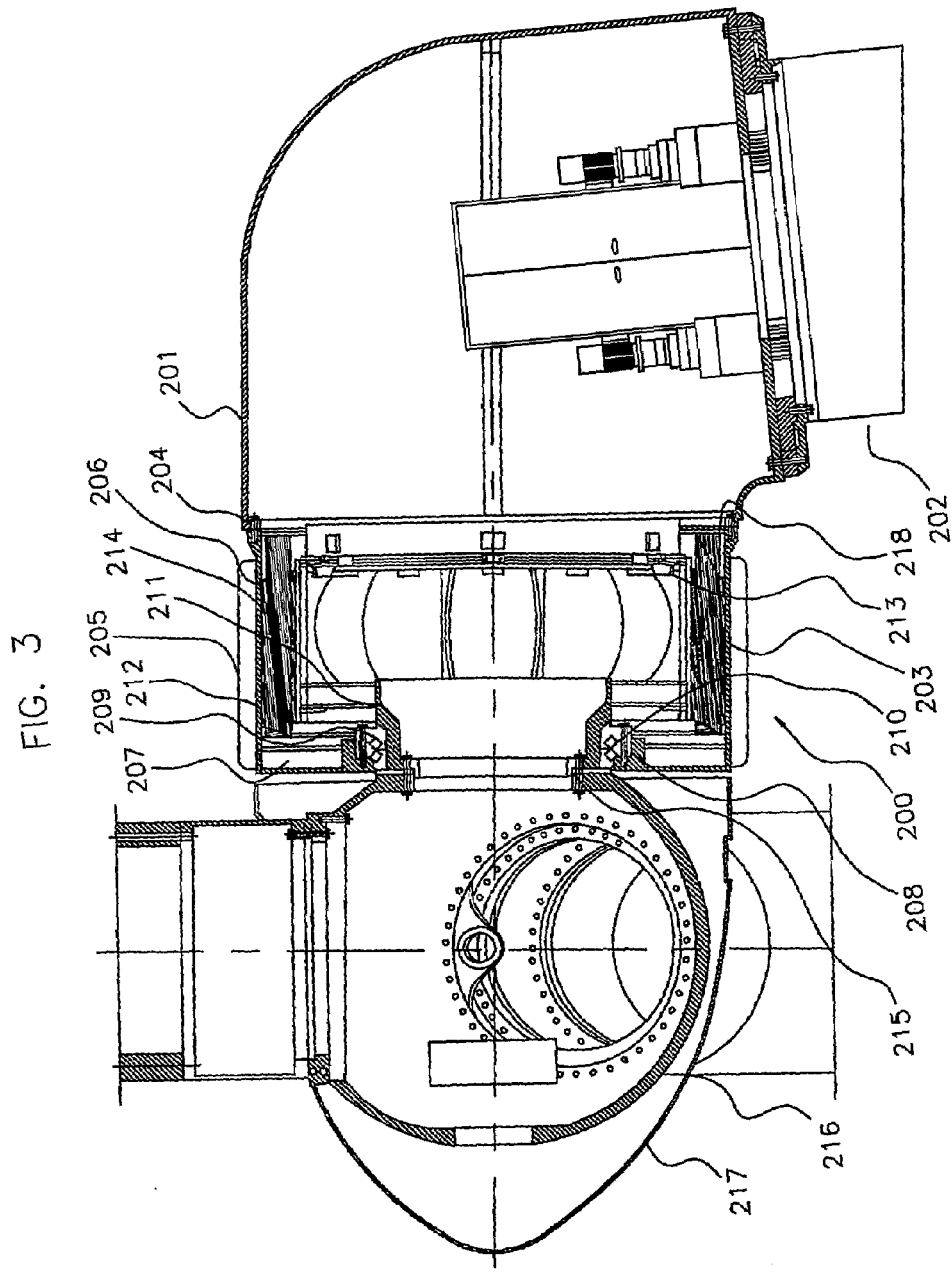
FIG. 3 shows a power generator according to embodiments in which the rotor tubular section is within the stator tubular section and a single bearing is employed.

In a preferred embodiment shown FIG. 3, the wind power generator 200 is affixed to a frame 201 on the upper end of a tower 202 that is only partially shown. In this case as well, the wind power generator 200 has a stator formed with a substantially tubular cross section 203. One end of the tubular stator 203 is fastened, such as by a screw connection 204, to the frame 201. While the stator is shown on the outside as preferred, it should be apparent that the rotor could be on the outside in a fashion similar to the arrangement of FIG. 2.

Radial cooling fins 205 extend from the outer surface of the outside member, preferably in substantially equally spaced apart relationship to one another. The fins 205 can extend parallel to the longitudinal axis of the stator 203, but could also have a profile taking into account disturbances in the air stream induced by motion of the blades and/or the fins 205 themselves. Preferably, the fins 205 project transversely from the outer surface. In FIG. 3, in which the tubular stator 203 is the outer member, the radial cooling fins 205 extend from the outer surface of the tubular stator 203, while stator windings 206 are mounted on the inside surface of the tubular stator 203. On the end of the tubular stator 203 facing away from the screw connection 204, the windward end of the stator 203, the stator 203 possesses a bell-shaped extension that narrows toward the hub of the generator, ending in a torus-shaped, sandwich-like head 207 with a central orifice. This head 207 supports on an inner surface of its orifice an outer ring 208 of a bearing 210, preferably a tapered roller bearing. The tubular rotor 213 has a corresponding, coaxial bell-shaped extension narrowing within the stator 203 to its own head/toroidal bottom 212 with its own central orifice that forms a tubular boss 211 within the central orifice of the stator 203. The tubular boss 211 carries an inner ring 209 of the bearing 210 so that the boss 211 is supported by the stator 203 in conjunction with the outer ring 208 of the bearing. The tubular rotor 213 preferably carries permanent magnets 214 its outer surface such that the magnets 214 lie opposite the windings 206 on the substantially tubular stator 203. It should be noted that, as with the embodiments shown in FIGS. 1 and 2, the preferred permanent magnets 214 could be replaced with field windings, but that the permanent magnets 214 afford at least the advantage of not requiring a power source to generate magnetic fields. The substantially tubular rotor 211 is preferably connected to a hub 216 by, for example, a screw connection 215 having a covering or hood 217.

On the side facing away from the tubular boss 211, the leeward end of the tubular rotor 213, the rotor 213 is preferably oriented toward a brake supporting structure 218, which can brake the tubular rotor 213, thereby slowing or stopping the rotational motion of the blades.

It will be appreciated that various of the above-disclosed and other features and functions, or alternatives thereof, may be desirably combined into many other different systems or applications. Also, it should be noted that various presently unforeseen or unanticipated alternatives, modifications, variations or improvements therein may be subsequently made by those skilled in the art which are also intended to be encompassed by the following claims.

What is claimed is:

1. A wind power generator comprising:
   a substantially tubular rotor and a substantially tubular stator, the stator being supportable by a support tower;
   each of the rotor and the stator carrying one of mutually opposed magnetic field generators and windings;
   the stator and rotor being substantially concentric such that one of the stator and rotor lies at least partly within the other of the stator and rotor and such that the mutually opposed magnetic field generators and windings face each other;
   a hub attached to the rotor at an end of the rotor opposite the support tower and supporting at least two blades extending radially therefrom; and
   a single bearing mounted diametrally between the stator and the rotor such that an inner race of the bearing is carried on a hub end of the inner of the stator and the rotor and an outer race of the bearing is carried on a hub end of the outer of the stator and the rotor, the single bearing handling both thrust and journal loading.

2. The generator of claim 1 wherein the rotor lies at least partly within the stator and includes a tubular boss of narrower diameter on which the inner race of the bearing is mounted.

3. The generator of claim 2 wherein the rotor carries magnetic field generators facing windings mounted on the stator tubular section.

4. The generator of claim 1 wherein the magnetic field generators are permanent magnets.

* * * * *